April 26, 1960 VON D. POLHEMUS ET AL 2,934,352
VEHICLE FLUID SUSPENSION

Filed Nov. 19, 1956 4 Sheets-Sheet 1

INVENTORS
Von Dale Polhemus
BY Max Ruegg
R.T. Barnard
ATTORNEY

April 26, 1960   VON D. POLHEMUS ET AL   2,934,352
VEHICLE FLUID SUSPENSION

Filed Nov. 19, 1956   4 Sheets-Sheet 3

INVENTORS
Von Dale Polhemus, E.
BY Max Ruegg
R.P. Barnard
ATTORNEY

April 26, 1960 VON D. POLHEMUS ET AL 2,934,352
VEHICLE FLUID SUSPENSION
Filed Nov. 19, 1956 4 Sheets-Sheet 4

Fig.6

INVENTORS
Von Dale Polhemus, &
BY Max Ruegg
R.P. Barnard
ATTORNEY

United States Patent Office 2,934,352
Patented Apr. 26, 1960

2,934,352

VEHICLE FLUID SUSPENSION

Von D. Polhemus, Franklin, and Max Ruegg, Detroit, Mich., assignors to General Motors Corporation, Detroit, Mich., a corporation of Delaware Application November 19, 1956, Serial No. 623,103

2 Claims. (Cl. 280—106.5)

The present invention relates to a suspension mechanism for automotive vehicles and, in particular, to a fluid suspension means for transmitting load and controlling relative movement between a vehicle frame and a ground engaging or supporting means operatively connected thereto.

In recent years, improvements in suspension to enhance the riding characteristics of automobiles have been achieved by a better understanding of the phenomena and characteristics of chassis shake, but these improvements have been made without any appreciable improvement in the vertical riding qualities of the cars. To improve riding qualities, the frequency of vertical ride motion must be slowed down and, to do this, the static deflections of suspensions must be increased, which can only be accomplished for any given vehicle by reducing spring rates. With steel springs it is not feasible to lower the spring rates much beyond where they are today for to do so would cause an increasing variation between the loaded and unloaded standing height of the vehicle frame relative to its supporting wheels.

Thus, for some time it has been apparent that a new suspension medium has been needed which could maintain a car at a substantially constant static standing height for any variation in car load. The use of air as a suspending medium is considered to be the best approach to the problem since air is the cheapest, lightest and most readily available fluid which will accomplish the results desired, although other fluids may be employed. In using air springs, enough air may be conveniently contained in a primary air chamber, in which air is compressed due to relative oscillation of the vehicle frame and its supporting wheels, to provide spring rates equal to those used on the production car of today using conventional steel coil springs. In addition, however, extra chambers may be utilized for the expansion of air from the primary chamber as air is compressed therein, thereby providing lower spring rates to further improve the riding qualities of vehicles.

The need for additional air chambers for lowering spring rates results in a need for space in the vehicle construction for these chambers. As is common knowledge, there is not too much space available in present vehicle designs to accommodate the various components required for such a fluid suspension system. This problem is further aggravated by the modern tendency to equip vehicles with various power accessories which further require compressing systems, storage tanks, valving and other requisite plumbing. On the other hand, the provision of supplementary fluid chambers results in a reduction of the size and particularly the overall height, of the primary spring unit required to perform its suspending function; thus the unit need not be so large as to protrude through the deck of a rear storage trunk or passenger compartment of a vehicle. Therefore, there is the necessity for utilizing supplementary fluid chambers or to otherwise design a single primary fluid spring chamber having a great enough capacity to provide the low spring rate desired for a smooth ride without interfering with the overall vehicle design by requiring presently unavailable space.

The present invention provides a fluid spring unit which is so constructed and associated with the vehicle as not to interfere with the design of the vehicle compartments by protruding therethrough and which results in a very compact unit which does not require presently unavailable mounting space.

In its simplest form, this invention when adapted to a conventional automotive vehicle provides a fluid spring chamber having a greater capacity than heretofore possible without various components of the fluid spring projecting upwardly to an undesired extent.

The present invention, more particularly, contemplates the utilization of a hollow vehicle frame member as a primary, and possibly a secondary, fluid chamber of the fluid spring unit. By completely enclosing the fluid chamber or chambers within a hollow frame member of the vehicle, it is possible to provide a large fluid chamber as an integral part of the vehicle frame thereby avoiding the use of space needed for other accessories.

A further advantage of this invention is that, since the hollow frame member is of such a size as to supply the desired large expansion chamber, a supplementary fluid chamber of smaller than ordinary size may be conveniently employed in a presently unoccupied position in conjunction with the hollow member to afford additional expansion volume.

As disclosed by this invention, the spring unit utilizes air as the suspending medium and comprises at least one air reservoir or primary spring chamber having a flexible wall engaged by a piston operatively connected to the ground engaging vehicle supporting means, the latter being operatively connected to the vehicle frame in the usual manner by control arms. The primary air chamber of such a spring is formed within a hollow portion of a frame member such as the transverse cross beam extending between two longitudinally extending frame side members as is the usual practice.

Alternatively, a demountable spring unit may be employed comprising a housing having an open end, a flexible closure for this open end, a damper head within the housing separating it into first and second air chambers, and a piston engaging the flexible wall of the chamber and operatively connected to the vehicle supporting means. In such an embodiment, the air spring housing may be suitably demountably supported within a cavity formed in a vehicle frame member such as the aforementioned transversely extending cross member. In such a construction, it may be desirable to further utilize a third chamber for expanding air such as a supplementary bottle or reservoir carried externally of the frame member body and connected through a wall thereof to the air spring for fluid transfer therebetween.

These and other advantages of this invention will appear more fully hereinafter as the description of the invention proceeds, reference being made therein to the accompanying drawings in which:

Figure 6 is a cross sectional view of still another embodiment of the air spring.

Figure 2:
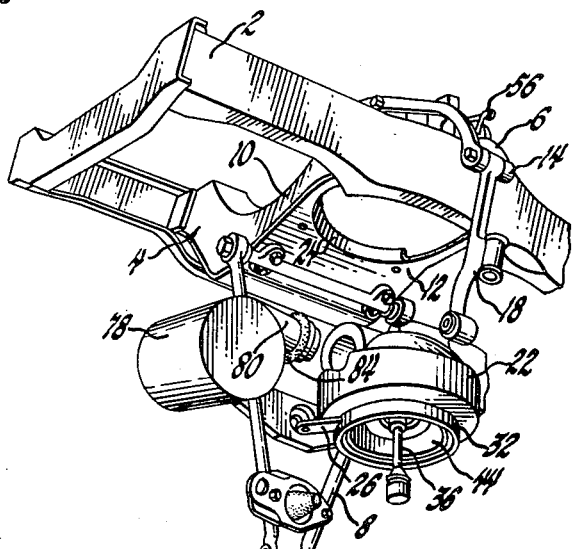
Figure 2 is an exploded view of the spring unit of Figure 1 prior to mounting.
Figure 3:
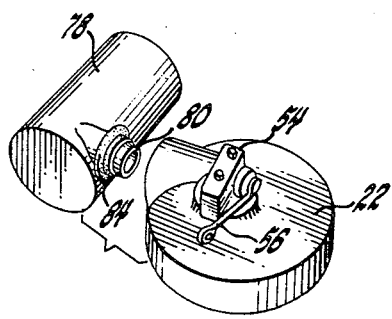
Figure 3 is an exploded view of the spring unit and a supplementary air chamber therefor.
Figure 4:
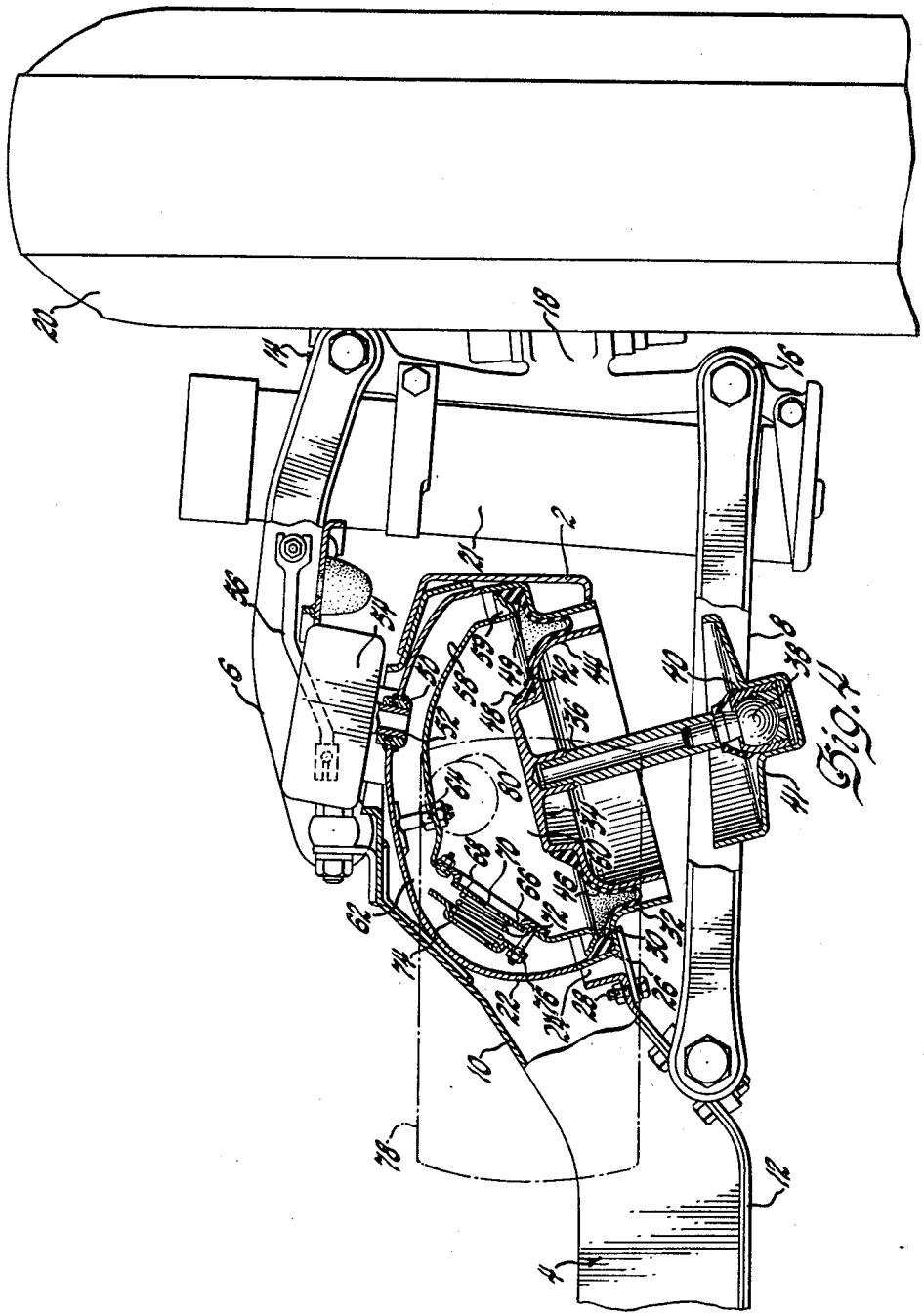
Figure 4 is a vertical cross sectional view of a front wheel suspension employing a demountable spring unit.

Three preferred embodiments of the present air spring have been disclosed in Figures 4, 5 and 6, Figures 1, 2 and 3 further disclosing the mounting arrangement of the demountable spring unit assembly of Figure 4. Furthermore, as the description of the invention proceeds, reference will be made to an air spring for a front wheel suspension although it is to be understood that other fluids may be employed as the suspending medium. Air has been selected as a preferred medium because it is cheap, readily available, and has been found to possess characteristics very suitable for suspension purposes. Also, the air springs of this invention may also be used in conjunction with rear suspensions after suitable modifications are made which will be apparent to those skilled in the art. Although only one front wheel and its spring suspension have been illustrated in the drawings, it will be recognized that there are two such front suspensions and two air springs for the rear suspensions of a vehicle.

Referring now to Figures 1 through 4, inclusive, there is shown one embodiment of this invention which comprises a demountable air spring unit for a vehicle comprising the usual laterally spaced longitudinally extending side frame members 2 transversely interconnected by a hollow cross member 4 which is generally box-shaped in configuration. Vertically spaced upper and lower control arms 6 and 8, respectively, are pivotally mounted in a well known manner on the upper wall 10 and lower wall 12 of the cross member 4. At their outer extremities 14 and 16, the control arms are suitably connected to a knuckle joint 18 which in turn is operatively connected in a well known manner to a frame supporting means which, in this case, are the vehicle wheels 20. The upper and lower control arms may be of conventional wishbone construction as is well known in the art. A suitable mechanism 21, forming no part of this invention, may be employed to dampen wheel vibrations.

A demountable air spring unit interconnects the frame cross member and the lower control arm of the supporting means to transmit loading and control the relative movement therebetween. An air spring unit constructed in accordance with this embodiment of the invention as shown particularly in Figure 4 comprises an outer housing 22 which is demountably supported in a cavity 24 in the hollow cross member by means of a plurality of tabs 26 suitably connected to the lower wall 12 of the cross member as by the threaded fasteners 28. This housing has a radially inwardly projecting annular shoulder portion 30 and a downwardly projecting cylindrical skirt portion 32 forming an opening into the spring unit housing. A piston 34 is operatively connected by a connecting rod 36 to the lower control arm 8 by a non-metallic ball joint 38 seated in a suitable socket 40 carried by a mounting bracket 41 located intermediate the length of the lower control arm. The piston has an outwardly flared annular shoulder 42 and depending cylindrical skirt portion 44 which is radially spaced from the skirt portion 32 of the spring unit housing, the piston thereby being adapted for loose reciprocable movement into and out of the spring unit housing as the vehicle frame moves relative to the lower control arm and the vehicle wheels.

An annular flexible diaphragm 46 has an inner peripheral bead 48 seated upon the shoulder 42 of the piston while the outer annular bead 49 thereof is seated on the shoulder 30 and side wall of the spring unit housing. This flexible diaphragm forms a movable wall sealing off the interior of the housing 22 from communication with the atmosphere through the annular space between the skirts of the housing and piston and may be made of rubber or other elastomer suitably reinforced with nylon cords as is well known to those skilled in the art.

The upper wall of the spring unit housing 22 contains an adapter 50 therein through which a neck 52 from a leveling valve 54 may extend, the leveling valve being positioned just above the upper wall of the hollow frame member between the arms of the upper wishbone. The leveling valve may be suitably responsive to the relative movement between the frame and vehicle wheels by a mechanical linkage such as the arm 56 which interconnects the leveling valve and the upper wishbone control arm. Neither a specific leveling valve nor a leveling system forms any part of the present invention. For the purpose of this disclosure, it is only necessary to point out that the leveling valve 54 may be in suitable fluid communication with an air tank or compressor or other source of fluid pressure and also, through a separate fluid line, to atmosphere or a low presure storage chamber so that air may be supplied to the spring unit through the leveling valve or transferred from the spring unit through the valve to atmosphere or such a low pressure chamber. In such a system, the leveling valve responds to a change in the relative position of the vehicle frame and its supporting wheels to either supply air to or exhaust air from the spring unit. For example, if a vehicle equipped with air suspension is standing at a curb while passengers are entering the vehicle, the increased loading will cause the vehicle frame to move downwardly with respect to its supporting means and the ground. Such relative movement will cause the arm 56 to move thereby actuating the leveling valve to supply air to the spring unit until the normal height of the vehicle frame is reached above the ground level and in relation to its supporting means.

The air spring unit of Figure 4 may further include a damper head or shell 58 which has a peripheral edge 59 return bent and seated about the inner surface of the annular bead 49 of the flexible diaphragm thereby forming within the spring unit housing a primary air chamber 60 and a secondary or expansion chamber 62. Locking means 64 extends between the upper surface of the shell and the inner surface of the housing to maintain the edge of the damper head in sealing engagement with the outer peripheral bead of the diaphragm. An aperture 66 in the damper head is closed by a plate type valve 68 having a smaller aperture 70 therein. A spring 72 normally maintains the valve plate 68 on its seat closing the larger aperture 66. This spring 72 is maintained under compression by the mounting plate 74 which is suitably supported by the damper head by means of bolts 76.

In operation, the piston 34 will move into and out of the primary air spring chamber as the vehicle frame moves relative to its supporting wheels. Thus, as the frame moves downwardly relative to the vehicle wheels, upward movement of this piston together with accompanying movement of the flexible diaphragm compresses air within the primary air or spring chamber. In compression, after the piston has moved into the primary reservoir to a certain extent, the plate valve 68 will be forced off its seat thereby allowing air under pressure to expand from the primary to the secondary air chamber through the large opening 66. Upon initial rebound of the piston, the valve plate 68 will again be seated thereby allowing air to return from the secondary air chamber to the primary air chamber through the relatively restricted opening 70 in the valve plate. By utilizing the smaller opening 70 for the return of air to the primary air reservoir, undue rebounding of the spring unit is avoided thereby accomplishing in part the function of a shock absorber to dampen recurrent oscillatory movement of the suspension.

If it becomes desirable to employ such a demountable spring unit and an additional air chamber is required for expansion of air from the primary air chamber to thereby further reduce spring rates, an auxiliary reservoir or chamber 78 having a neck 80 may be connected to the secondary air chamber through a side wall 82 of the frame cross member. The neck of this auxiliary reservoir is provided with an annular sealing gasket 84 which is so formed as to have a peripheral lip engaging the inner surface of the spring unit housing 22 so as to be sealed against it by air pressure.

Figure 1:
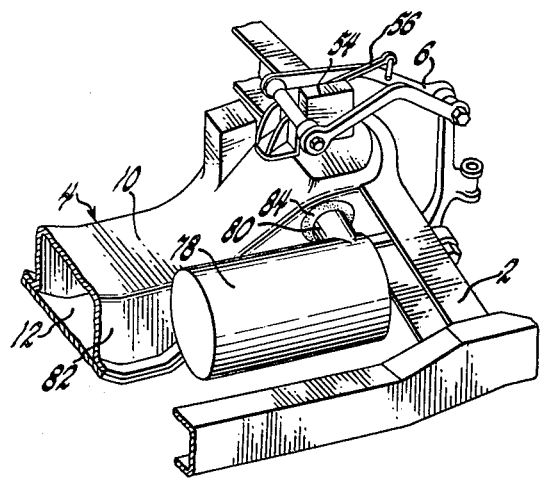
Figure 1 is a partial perspective view of a demountable air spring unit supported within a vehicle frame member.

It will be apparent that an air spring unit as specifically disclosed in Figure 4 need not necessarily be used in conjunction with the mounting shown in the Figures 1 through 3 or with the auxiliary reservoir 78. Rather, the air spring unit may have but one chamber instead of a primary and a secondary chamber as disclosed in Figure 4. In designing such a spring unit within limitations imposed by the overall design of the vehicle and mounting space available, it is convenient to have a primary air spring chamber which would correspond generally to a conventional coil spring in terms of the spring rate and stiffness available. Secondary or further auxiliary air chambers are then employed to accommodate expansion of air from the primary chamber thereby lowering the spring rates to give a smoother and softer ride. In any event, whether or not a primary and secondary or only a primary chamber is formed within the spring unit housing 22, the auxiliary air reservoir may be suitably fluidly connected to the unit to provide a further expansion volume to lower the spring rate.

Figure 5:
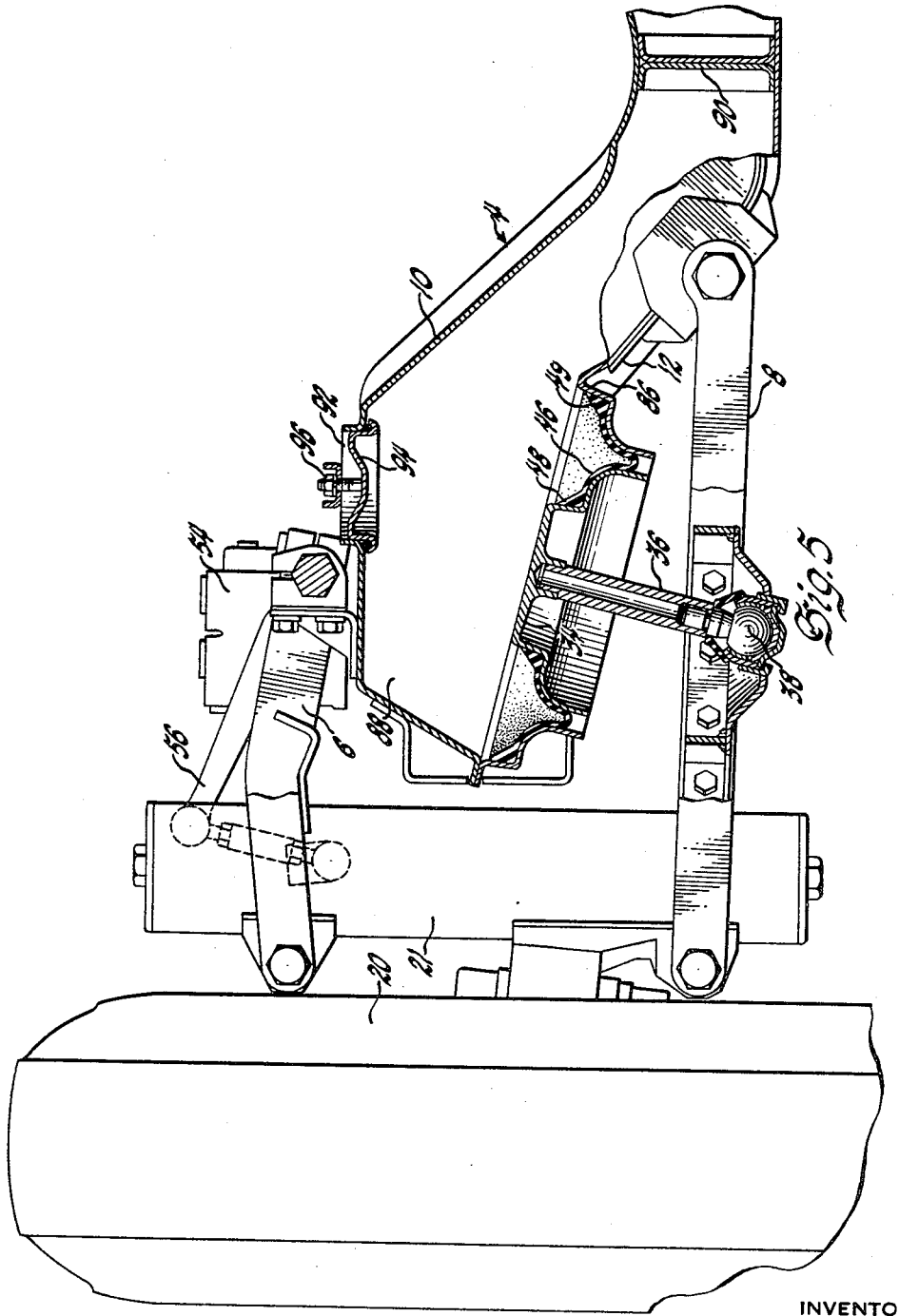
Figure 5 is a vertical cross sectional view of a front wheel suspension disclosing another embodiment of the air spring of this invention.

Referring now to Figure 5, there is shown another embodiment of this invention in which the hollow frame cross member 4 has a lower wall 12 which has formed integral with it near its outer end a diaphragm retainer 86 through which the piston may reciprocate. As in the embodiment aforedescribed, a flexible diaphragm 46 is suitably seated on the piston head and on the diaphragm retainer to move relative to the primary spring chamber 88 formed wholly within the hollow cross member 4. A structural member 90 seals off the inboard end of the cross member to completely enclose the air spring within the hollow cross member, the flexible diaphragm forming a movable wall of the spring chamber. An opening 92 in the upper wall 10 of the cross member provides access to the interior of the air chamber and is normally closed by a suitably sealed cover 94 maintained in place by the locking bracket and bolt assembly 96. It will be noted that in this embodiment the upper and lower wishbone control arms have their outer ends suitably mounted to the substantially vertically disposed dampening means 21, which is operatively connected in the usual manner to the vehicle wheel. As disclosed in the previous embodiment, a suitable leveling valve and control linkage therefor is provided for operation in response to relative movement between the vehicle frame and supporting means.

In Figure 6 there is shown still another embodiment of this invention in which the embodiment of Figure 5 has been modified by the inclusion of a damper head 58 having a return bent peripheral edge 59 sealingly seated against the inner surface of the outer peripheral bead 49 of the flexible diaphragm forming the movable wall of a primary air or spring chamber 98. As in Figure 4, a plate type spring biased valve 68 controls fluid communication through the opening 66 between the primary chamber 98 and the secondary expansion chamber 99 formed by the damper head 58 and structural member 90 within the hollow cross member.

Therefore, it will be seen that in each of the preferred embodiments of this invention the necessary spring and expansion chambers are afforded by the use of a hollow cross frame or auxiliary air reservoir so as to lower the spring rates of the unit. In the embodiment shown in Figures 5 and 6, the air spring is not demountable but makes full use of the hollow structural member to provide an adequately sized chamber for expansion of the air. In Figure 4, the spring unit is demountable within a cavity formed in the cross member and an auxiliary air chamber may, if required, be connected through a wall of the cross member to the spring unit. Alternatively, the secondary chamber of the demountable unit of Figure 4 may be fluidly connected to the interior of the hollow frame member. Thus by utilizing to the fullest extent the cross frame construction, air springs may be conveniently utilized to provide the desired low spring rates without necessitating the incorporation into the vehicle of various large attached air reservoirs and, because of the large volume available within the hollow cross member, without using a spring having so great a vertical height as to have a component thereof extending up through the floor of the vehicle.

We claim:

1. A fluid spring unit for transmitting loading between a vehicle frame and supporting means operatively connected thereto, said spring unit comprising a housing having an open end, an annular shoulder formed within said housing and surrounding said open end, a flexible diaphragm having an outer peripheral edge sealingly seated upon said shoulder and extending across said open end thereby forming a movable wall of said housing, a piston engaging said movable wall for reciprocation in the open end of said housing and operatively connected to said vehicle supporting means, a damper head enclosed within said housing and sealingly seated against the peripheral edge of said flexible diaphragm to enclose between the latter and the damper head a primary fluid spring chamber, said damper head being spaced from said housing to form therebetween a secondary fluid chamber, means carried by said damper head for fluid interchange between said chambers, a cavity in said vehicle frame member, and means for demountably supporting said spring unit housing within said cavity.

2. Fluid suspension means for a vehicle having a frame and supporting means operatively connected thereto, said suspension means including a spring unit comprising a fluid spring chamber open at one end, a piston reciprocably mounted with respect to said open end, a flexible diaphragm sealingly engaging said piston and having its peripheral edge seated in said chamber and forming a movable closure for the open end of the latter, a damper head having its peripheral edge seated on the periphery of said diaphragm and enclosing with the latter a primary spring chamber, said damper head being spaced from the wall of said fluid spring chamber and forming therewith a secondary spring chamber, means establishing fluid communication between said primary and secondary fluid chambers, and adjustable connecting means between the wall of said chamber and said damper head to urge the peripheral edge of the latter into airtight sealing engagement with said diaphragm.

References Cited in the file of this patent

UNITED STATES PATENTS

| | | |
|---|---|---|
| 850,180 | Podstata | Apr. 16, 1907 |
| 971,583 | Bell | Oct. 4, 1910 |
| 1,077,472 | Hofmann | Nov. 4, 1913 |
| 1,414,623 | Church | May 2, 1922 |
| 2,115,072 | Hunt | Apr. 26, 1938 |
| 2,257,913 | Maranville | Oct. 7, 1941 |
| 2,663,569 | Gouirand | Dec. 22, 1953 |